United States Patent
Smith

[15] 3,699,692
[45] Oct. 24, 1972

[54] METHOD AND APPARATUS FOR LAYING PIPELINES GROUPED IN A BUNDLE

[72] Inventor: Leif H. Smith, Houston, Tex.
[73] Assignee: Brown & Root, Inc., Houston, Tex.
[22] Filed: July 2, 1971
[21] Appl. No.: 159,343

[52] U.S. Cl. ...................61/72.3, 53/198, 138/111, 138/112
[51] Int. Cl. .......B63b 35/04, F16l 1/00, B65b 13/00
[58] Field of Search ..........61/72.3, 72.1, 72.4; 53/3, 53/198 R; 138/111, 112; 166/0.5, 0.6

[56] References Cited

UNITED STATES PATENTS

| | | | |
|---|---|---|---|
| 1,060,785 | 5/1913 | Pahl | 61/72.3 |
| 1,818,922 | 8/1931 | Parker | 138/112 |
| 3,425,453 | 2/1969 | Fuller | 138/111 |
| 3,604,731 | 9/1971 | Petersen | 166/0.6 |

FOREIGN PATENTS OR APPLICATIONS

1,138,287  10/1962  Germany....................61/72.3

*Primary Examiner*—Jacob Shapiro
*Attorney*—Burns, Doane, Swecker & Mathis

[57] ABSTRACT

A pipeline laying operation wherein a continuous pipeline bundle comprised of a plurality of conduits is payed out from a floating vessel onto a submerged surface under the control of a tensioned flexible cable. The conduits are strapped to an alignment and spacer member at a plurality of longitudinally spaced bundling zones. The cable, the spacer and the pipeline bundle are placed in a force transmitting relationship, i.e., the weight of the pipeline bundle is transmitted to the cable at the spacer locations. Tension is applied to the cable at the floating vessel, to react the applied pipeline bundle weights at the spacers, maintaining the pipeline bundle conforming to a chosen configuration, which will keep the pipe stresses within a given level. Feed paths, defined by roller assemblies, for each of the conduits on the vessel maintain the end portions of the conduits laterally spaced and induce convergence of the conduits toward a bundling station.

32 Claims, 15 Drawing Figures

METHOD AND APPARATUS FOR LAYING PIPELINES GROUPED IN A BUNDLE

BACKGROUND OF THE INVENTION

This invention relates to pipeline laying operations. More particularly this invention relates to pipeline operations for laying a continuous pipeline bundle, comprised of a plurality of conduits, from a floating vessel means and onto a submerged surface.

In the past, pipeline systems have been proposed wherein a plurality of conduits, grouped in a pipeline bundle, are positioned on a submerged surface. Such systems are exemplified in the disclosures of a U.S. Pat. No. 3,425,453 to Fuller and a U.S. Pat. No. 3,086,369 to Brown.

The technique described in the Brown patent involves the banding of conduits together into a bundle at a shore location, and thereafter floating the bundle to a offshore position. From this position, the bundle is lowered to a submerged surface. According to the Fuller patent disclosure, a multi-conduit pipeline is fabricated on a floating vessel by welding a plurality of circumferentially spaced conduits peripherially to a core conduit, or by welding a plurality of circumferentially spaced conduits to circumferentially spaced rods. Although such techniques may be acceptable for some purposes, they may often prove undesirable for a number of reasons.

For example, the Brown technique may prove cumbersome in the fabrication of pipelines of significant lengths. It would, therefore, be more desirable to provide a pipeline laying operation wherein the positioning of a pipeline bundle on a submerged surface may be accomplished by paying out the bundle from a floating vessel than to fabricate the pipeline bundle on a shore location and float sections of such bundles to an offshore location.

On the other hand, the Fuller technique, which involves reliance upon a longitudinally welded nature of the conduit grouping, may unduly stiffen the pipeline bundle being laid. Moreover, the actual operation of welding the conduits longitudinally together, and the resulting need for inspection of each weld, may prove costly to an excessive amount. Problems of failure by reason of stress problems which may be created by such welding operation could also be compounded.

It would, therefore, be desirable to provide a novel technique wherein a plurality of conduits forming a continuous pipeline bundle may be continuously paid out as a bundle from the floating vessel and onto a submerged surface, without unduly stiffening the pipeline bundle and without requiring a welding operation for bundling.

The present invention embraces such a technique through the utilization of a cable from which the pipeline bundle is suspended and through which the pipeline bundle is controllably paid out from a floating vessel onto a submerged surface. Through the interaction of alignment and bundling spacers between conduits and the cable, the weight of the pipeline bundle is reacted by tension applied to the cable as discussed more fully hereafter.

The use of a cable means in connection with the offshore paying out of a cable, as in the case of a U.S. Pat. No. 1,060,785, to Pahl, and in connection with paying out of a single conduit pipeline, as in the case of a U.S. Pat. No. 580,226 to Sanford, has earlier been proposed. Additionally, the bundling of conduits by means of a spacer interposed between the conduits, which are then girded together about the spacer, has been proposed in a different, i.e., non-offshore laying environment, as may be seen from the disclosures in U.S. Pats. Nos. 1,799,673 and 1,868,881 to Burke.

These prior art concepts, however, fail to suggest an efficient solution to laying a pipeline bundle by employing a cable to control the profile of the bundle for a variety of reasons.

For example, the Sanford technique utilizes a clamp integrally joined with conduit sections for purposes of clamping the conduit to the cable. It will be readily apparent that the provision of such an integral clamp may require additional inspection operations to insure the integrity of the conduit, the absence of which may result in costly repairs. Also, if such a technique were adapted to the laying of a bundled group of pipelines, the pipeline bearing the clamps would necessarily support the weight of the entire pipeline group, unless each pipeline of the group were provided with a clamp.

Neither of these alternatives may be entirely acceptable since the first might create additional stress problems and the second might involve precision control of the tension in all cables associated with the clamps of each of the pipelines, as well as precise spacing of the clamps on the various pipelines themselves.

The Pahl technique, if adapted to laying pipelines in a bundle may avoid the use of such a clamp but would require that the bundle be serviced to the cable through a continuous wire or spaced wire ties. Such a technique could present many operationally unacceptable problems such as difficulty in maintenance of the pipelines in proper bundle orientation.

Various other problems may be envisioned in connection with attempts to lay continuous pipelines in a bundle utilizing a cable to control the paying out of and the profile of the pipeline bundle.

OBJECTS AND SUMMARY OF THE INVENTION

It is, therefore, a general object of the present invention to provide a novel pipeline laying technique for laying a continuous pipeline bundle comprised of a plurality of pipelines from a floating vessel means and onto a submerged surface while obviating and minimizing problems of the sore previously noted.

Recognizing problems such as maintaining the integrity of the pipelines in the bundle, insuring proper orientation of the pipelines in the bundle, and efficiently, as well as economically, operatively coupling the pipeline bundle to the cable, it is a particular object of the invention to provide such a technique wherein bundling may be obtained through the use of a bundle spacer and girding means means surrounding the pipelines in the bundle, while the spacer also functions to service the bundle to the cable.

It is a related object of the present invention to provide such a technique wherein interaction between the spacer and the payout serves to transmit the load of the pipeline bundle to the cable at each spacer station without the need for securing any clamps directly to the pipelines, and without the need for tying the cable to the pipelines of the bundle.

It is a related object of the invention to provide such a technique wherein bundling of the pipelines is enhanced through controlled guiding thereof.

A preferred embodiment of the invention intended to accomplish at least some of the foregoing objects entails the laying of a continuous pipeline bundle, comprised of a plurality of conduits, from a floating vessel means onto a submerged surface. A plurality of conduit spacer means are provided at longitudinally spacer locations, or bundling zones, along the length of the continuous pipeline bundle extending from the vessel toward the submerged surface. The conduits are strapped to the spacers at the bundling zones and the spacers may also function as alignment means for maintaining the conduits in a predetermined relative orientation.

A payout and profile control cable means extends from the floating vessel means along the continuous pipeline bundle and interacts with each of the spacer means in generally longitudinal forced transmitting relationship. In this fashion, the spacer is also utilized to service the bundle to the cable.

This interaction may be provided by spacer halves, both of which may clampingly engage the cable means. Additionally or alternatively a cable clamp may be interposed to engage the spacer. In another form of the invention, the interaction may involve clamping engagement of the cable means with both a spacer section and the pipelines oriented by the spacer.

Strapping of the plurality of conduits to each of the spacer means, such as with band or girding means, is accomplished so as to place the spacer means and the continuous pipeline bundle in force transmitting relationship adjacent the portions of the bundles engaging the spacer means. In this fashion, the portions of the bundle span between the spacer means are supported from the cable and the weight of the pipeline bundle is reacted by forces in the cable means at the location of each of the spacer means. At the same time the distance between bundling zones is maintained in a predetermined amount.

Tensioning means on the floating vessel is provided for imparting tension to the cable means in order to control the profile of the conduits in the bundle. Where the earlier mentioned cable clamp is employed adjacent the spacer means and about the cable on the side of the spacer means remote from the conduit free ends at the floating vessel means, the possibility of cable slippage is reduced.

The cable preferably extends generally longitudinally of the bundle and generally within the bundle envelope defined by the girding means. In this manner, stability of the bundle during the laying operation is enhanced. Particularly, such stability is aided where the cable is generally symmetrically positioned at least with respect to the lateral extent of the bundle.

A plurality of roller assemblies may be employed for laterally and generally longitudinally guiding the plurality of conduits on board the floating vessel along predetermined feed paths. The feed paths are such as to maintain the conduits spaced for joining of additional sections and related operations, while the feed paths for each of the conduits to be joined to the bundle eventually converge toward a single bundling station. Where more than two conduits are to be bundled, the roller assemblies advantageously guide the conduits at different elevations along the feed paths.

Other objects and advantages of the present invention will become apparent from the subsequent detailed description thereof with reference to the accompanying drawings in which like numerals refer to like elements, and in which:

DETAILED DESCRIPTION

General Summary

With reference to the accompanying drawings, preferred embodiments of a method and apparatus for laying pipelines grouped in a bundle, according to the present invention, may be understood.

Figure 1:
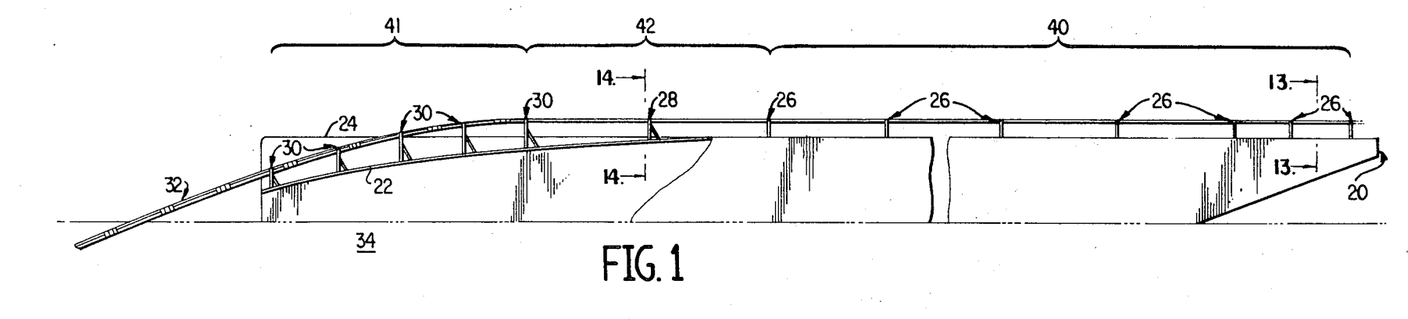
FIG. 1 is a side elevational view schematically depicting floating vessel means involved in a pipeline bundle laying operation according to the present invention.

As may be seen in FIG. 1, the pipeline laying operation according to the present invention utilizes a floating vessel means 20 which may be provided with a ramp 22 as a fixed portion thereof at the starboard side of the stern. The ramp 22 is generally inclined with respect to the deck 24 of the floating vessel means.

Slidably supported by rotatable rollers and guided on the floating vessel means 20, at a plurality of conduit guiding and supporting stations 26, 28 and 30, hereinafter more fully described, are plurality of elongate, flexible conduits ultimately grouped in an elongate, flexible pipeline bundle, schematically indicated at 32. The bundle 32 depends from the floating vessel means 20 into a body of water 34 toward a submerged surface (not shown).

In the embodiment of the present invention which FIGS. 2-11 relate, four conduits 36, 36, 38, 38 are depicted as being involved in the pipeline bundle laying operation. Two of the conduits 36, 36 may be considered to have a relatively smaller diameter (e.g., 2 inches) as compared with the remaining two larger diameter (e.g., 4 inches) conduits 38, 38. In the embodiment of the present invention to which FIGS. 12-15 relate, two conduits 38, 38 of generally the same diameter are depicted as being involved in the laying of the bundle 32 on the submerged surface. It will, however, be appreciated that the present invention may be adapted to, and embraces, bundle laying operations wherein different numbers of conduits and other diametrical relationships are involved.

The conduit guiding and supporting stations 26, 28 and 30 cooperate to define feed paths for laterally and generally longitudinally guiding the conduits 36 and 38 on the floating vessel means 20. As will become apparent from the subsequent discussion of FIGS. 4 and 13, the initial stations 26 may be located on the vessel deck 24 forward of the inclined ramp portion 22; and these stations 26 function together as the initial feed path zone 40 generally longitudinally aligned with that inclined ramp portion 22.

During passage of conduits through the initial feed path zone 40, the conduits are maintained laterally spaced from one another by substantially a fixed distance. Maintenance of the conduits laterally separated facilitates joining of additional pipe sections (not shown) to each of the conduits, as well as related operations such as joint inspection and the like. As will be appreciated, suitable welding stations and inspection stations (not shown), etc., are provided in the initial feed path zone 40. Also, pipe section storage areas and pipe section manipulating equipment (not shown) may be suitably provided.

The remaining guiding and support stations 28 and 30 are suitably located at longitudinally spaced positions on the inclined ramp portion 22 of the floating vessel means 20. These stations 28 and 30 are generally longitudinally aligned, in the sense of being generally coplanar, with the stations 26 of the initial feed path zone 40.

As hereinafter more fully described in connection with FIGS. 6 and 14, one station 28 on the ramp 22 additionally functions as a cable payout station. The next illustrated stations 30 in the feed path functions as a bundling station. Additional guiding and supporting stations 30 spaced along the ramp 22 in the terminal feed path zone 41 serve to establish a desired profile of the bundle 32 for entry into the water body 34 during payout.

In the feed path zone 42 between the bundling station 30 and the last guiding and support station 26 of the initial portion 40 of the conduit feed path, the conduits to be grouped together in a bundle are caused to generally laterally coverge toward one another for completion of a bundling operation.

As will subsequently become apparent, additional guiding and supporting stations may be provided in the feed path zone 42 of convergence so long as they are suitably dimensioned in conformity with the desired degree of convergence and/or relative elevation, if any, of the conduits in that zone 42.

At the guiding, supporting and payout station 28, and elongate, flexible and tensioned cable means 44 (FIGS. 7 and 15) is interposed intermediate the group of conduits for subsequent control over the profile and payout of the pipeline bundle 32. After the conduits pass that station 28 along their feed paths, they are strapped to conduit spacer means 46 (see particularly FIGS. 11 and 12) at the bundling station.

At this station, the pipeline bundle 32 and the spacer means 46 are placed in general force transmitting relationship at a plurality of bundling zones spaced longitudinally along the conduits. It will become apparent that this force transmitting relationship entails sufficient gripping of the conduits in the bundle 32 so as to prevent the conduits from sliding freely beyond the spacer means 46. At these bundling zones the cable means 44 and the spacer means 46 are placed in generally longitudinal force transmitting relationship.

Figure 4:
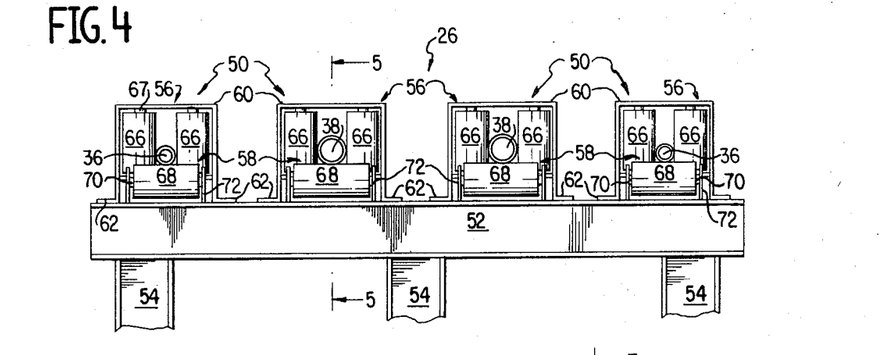
FIG. 4 is a partial transverse elevational view illustrating a conduit guiding and supporting station and taken along line 4—4 of FIG. 2.
Figure 5:
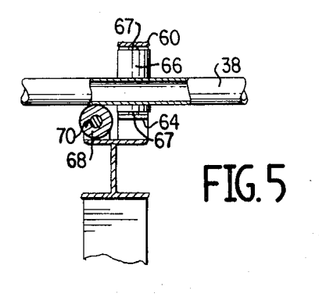
FIG. 5 is a partial cross-sectional view illustrating the conduit guiding and supporting station of FIG. 4 and taken along line 5—5 therein.
Figure 6:
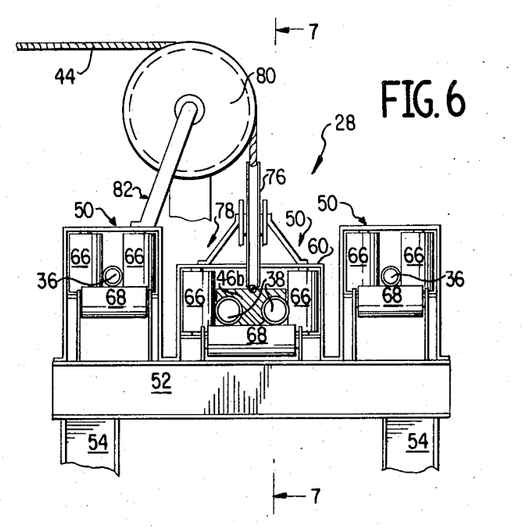
FIG. 6 is a partial transverse elevational view taken along line 6—6 of FIG. 2 and illustrating a conduit guiding and supporting station that also functions as a payout station.
Figure 7:
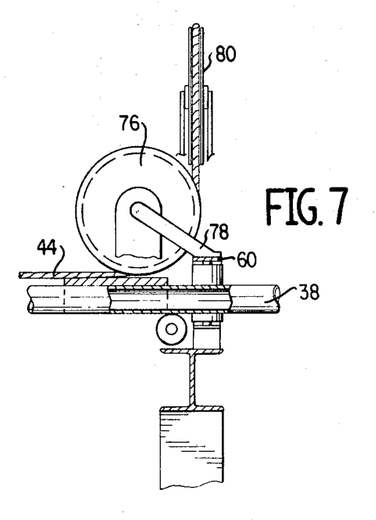
FIG. 7 is a partial cross-sectional view taken along line 7—7 of FIG. 6, with one conduit omitted for simplicity.

In the embodiment of FIGS. 2-11 wherein a spacer means 46 comprised of two spacer halves 46a and 46b is employed, one of the spacer halves 46b is installed at a feed path location adjacent to and forward of the payout station 28 (see FIG. 6). The remaining spacer section 46a may be installed at a location adjacent to but forward of the next guiding and supporting station 30 following the payout station 28. At the same time, the conduits may be bundled together by strapping the conduits to the spacer means 46.

In the embodiment of FIGS. 12-15 wherein a spacer means 46 comprised of a single spacer section is employed, this spacer means 46 is installed at the bundling zone adjacent to but forward of the guiding and supporting station 30 following the payout station 28.

When the floating vessel means 20 moves forward, the continuous pipeline bundle is payed out by paying out the flexible cable means 44. The tension in the flexible cable means 44 is maintained to control the profile of the continuous pipeline bundle.

As will be appreciated, the generally longitudinal force transmitting interaction of the cable means 44 and the spacer means 46, along with the force transmitting relationship of the spacer means 46 and the pipeline bundle 32, serves to transmit the weight of the pipeline bundle to the cable means 44 at the bundling zones. The preferred manner of placing the spacer means 46 and the cable means 44 in generally longitudinal force transmitting relationship is hereinafter more fully described.

Placing of the spacer means 46 in the pipeline bundle 32 in a force transmitting relationship may be accomplished in any suitable manner, such as by means of a plurality of girding or banding means 48 (FIGS. 10–12) surrounding the conduits of the bundle and the spacer means 46. The girding means or banding means 48 may be comprised of tensioned bands suitable clamped as indicated at 49.

Figures 9, 11, 12:
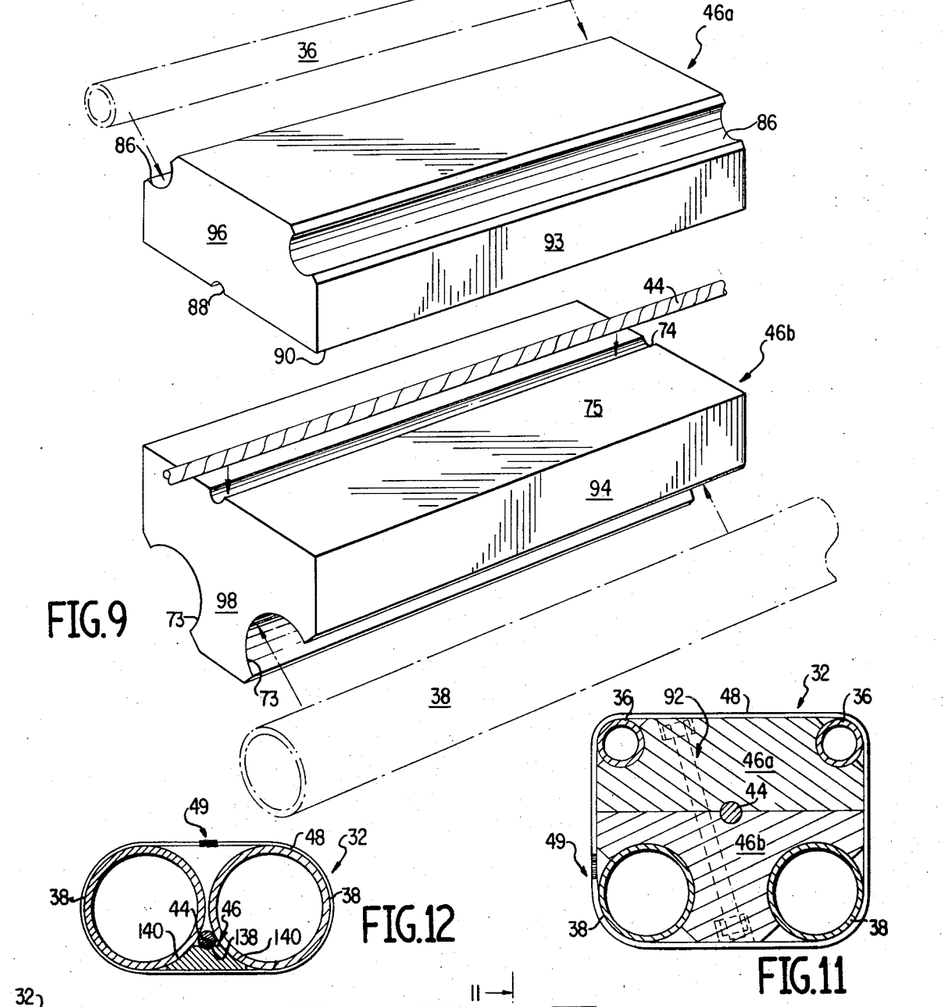
FIG. 9 is an exploded assembly view depicting the formation of a pipeline bundle according to the present invention utilizing one preferred form of conduit spacer and alignment means.
FIG. 11 is a cross-sectional view of the bundle taken along line 11—11 of FIG. 10.
FIG. 12 is a cross-sectional view of a pipeline bundle according to the present invention utilizing another preferred form of conduit spacer and alignment means.
Figure 10:
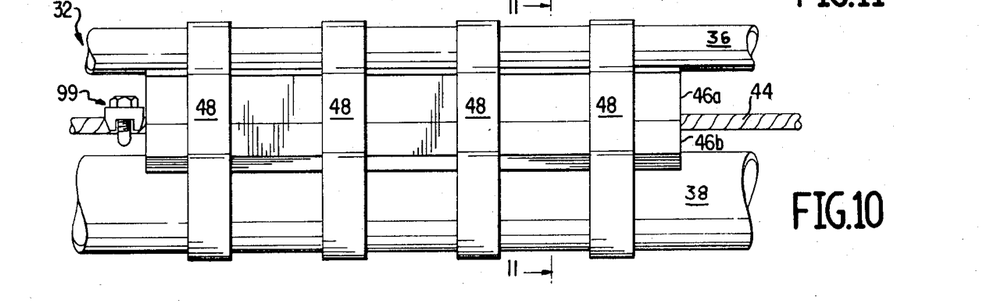
FIG. 10 is a partial side elevational view of one bundling zone portion of the pipeline bundle formed according to the present invention.

As will be appreciated, the banding or girding means 48 define a bundle envelope. Preferably, the operational coupling of the bundle to the cable means 44 is accomplished by positioning the cable means 44 within that bundle envelope to enhance stability of the bundle 32 during the payout operation. Further stability may be imparted to the system when the cable means 44 is positioned generally symmetrically with respect to the lateral extent of the pipeline bundle 32, i.e., centrally as indicated in FIGS. 11 and 12.

During initial stages of the laying operation, the generally central cable means 44 may be payed out and tied off to an anchor, platform leg etc., or otherwise positioned in any suitable manner. A suitable deck engine (not shown) may be employed to apply tension to the cable during the laying operation. This tension is necessary to partially react the weight of the pipeline bundle 32 while laying. When the laying operation is completed, the terminal portion of the bundle may be set over the side of the floating vessel means 20 with suitable davits (not shown), or the floating vessel means may be moved ahead to lay out from under the pipeline bundle 32.

Detailed Structure and Operation

With continued reference to FIG. 1, and with reference specifically to FIGS. 2–11, details of one preferred embodiment of the present invention may be appreciated.

Figure 2:
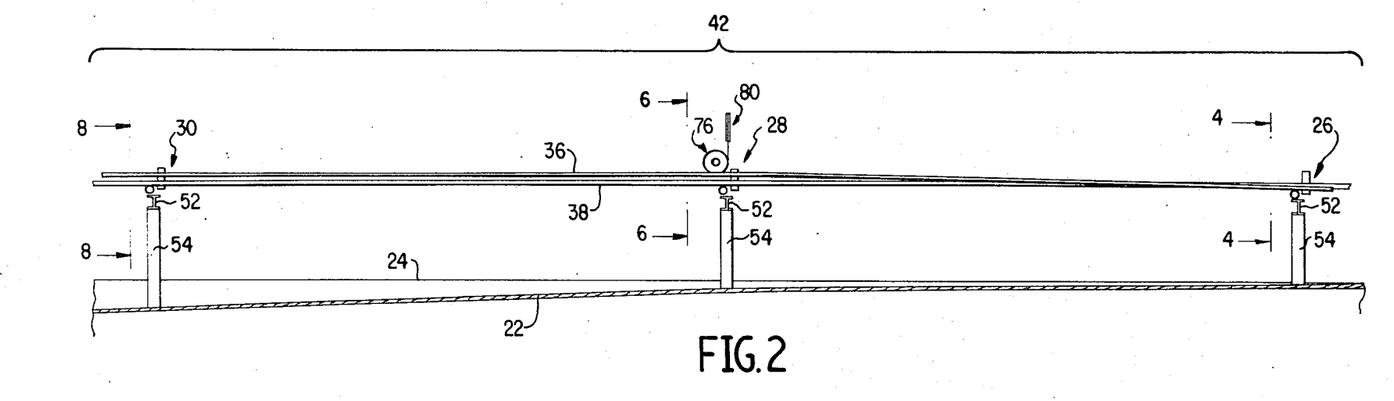
FIG. 2 is a partially cross-sectional, elevational view of a portion of the floating vessel means of FIG. 1 at the fixed inclined ramp zone and in somewhat greater detail.
Figure 3:
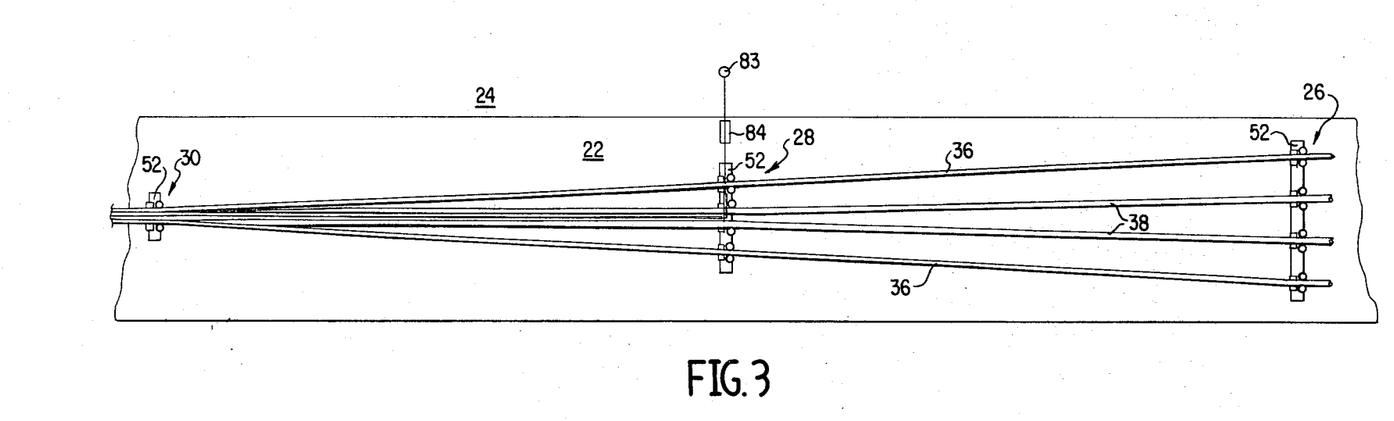
FIG. 3 is a top plan view of the fixed inclined ramp zone of floating vessel means shown in FIG. 2.

In FIG. 2, a section of the floating vessel means 20 including the zone 42 of conduit convergence is illustrated, with the inclined ramp portion 22 of the barge 20 shown in cross-section. FIG. 3 is a top plan view of the inclined ramp section 22 shown in FIG. 2, and illustrates the conduit convergence.

FIG. 4 illustrates in some detail one form of one of the initial guiding and supporting stations 26. As may be seen, this station 26 is arranged with four supporting and guiding roller sections 50 cooperable with the four conduits 36, 36, 38, 38. These roller sections 50 are laterally spaced from one another by a suitable distance and are suitably mounted on a transverse support member 52, which may take the form of an I-beam or the like (see FIG. 2).

The transverse support member 52 is in turn supported on generally vertically extending beams 54 spaced along the length thereof. Attaching of the transverse support member 52 to the beams 54 may be accomplished in any suitable manner, such as by welding.

Each of the roller sections 50 may be comprised of a revolving lateral guiding roller section 56 and a revolving horizontal support section 58, with each roller section 56 and 58 being suitably attached to the transverse supporting beam 52.

The lateral guiding section 56 may be comprised of a generally U-shaped bracket 60, which may include outwardly flanged attaching legs 62, along with a transverse supporting element 64 (FIG. 5). Two spaced and generally parallel rollers 66 are rotatably supported for rotation about a generally vertical axis in any suitable manner. For example, roller shafts 67 cooperating with the bracket 60 and the supporting element 64 may be employed for this purpose (FIG. 5). As illustrated, the lateral spacing between the guide rollers 66 is sufficient to accommodate for the diameter of the conduit 36, 38 with which the rollers cooperate for lateral guidance. Although a spacing substantially equal to the conduit diameter is illustrated, it will be apparent that somewhat wider spacings may be employed.

The horizontal supporting section 58 includes a roller 68 which may be mounted for rotation about a substantially horizontal axis in any suitable manner, such as by means of roller shafts 70 cooperating with a generally upwardly facing support bracket 72. The bracket 72 may be mounted to the transverse support member 52 aft of the lateral guiding section 56, as illustrated, or forward thereof if desired. Generally, the horizontal support section 58 may be symmetrically located with respect to the lateral guiding section 56 forming the respective roller assembly 50.

Each of the guiding and support stations 26 illustrated in FIG. 1 may take the form of the FIG. 4 arrangement, with each section being generally longitudinally aligned with, and situated at a similar elevation as, the other sections. The generally fixed lateral spacing thereby maintained between the conduits 36 and 38 facilitates joining of additional pipe sections to these conduits.

Between the last of the initial support stations 26 and the payout and guiding station 28, the conduits 36, 36, 38, 38 are caused to generally converge toward a central location (FIG. 3). This may be accomplished through the arrangement of roller assemblies 50 at the payout station 28.

From FIG. 6, it may be seen that the payout station 28 may be comprised of another transverse supporting member 52 suitably mounted on generally vertical support beams 54. However, only three roller assemblies 50 are supported on the transverse support member 52. The roller assemblies 50 may be substantially identical to the roller assemblies 50 discussed in connection with FIG. 4.

It will, however, be apparent that the lateral distance between the outer roller assemblies which cooperate with the conduits 36 at the payout station 28 is less than the lateral distance between the outermost roller assemblies 50 of the support stations 26. In this fashion, initial convergence of the outer conduits 36 is induced.

At the payout station 28, the intermediate roller assembly 50 cooperates with both of the intermediate conduits 38 and the lower spacer section 46b for lateral guidance. The spacing between the lateral guiding rollers 66 is, of course, less than the spacing between the conduits 38 maintained at the initial support stations 26. Hence, the conduit sections 38 are caused to converge. It is this convergence which permits installation of the lower spacer section 46b.

In FIG. 6, the lower section 46b of a spacer means 46 comprised of two halves is shown as installed. This bottom spacer section 46b is provided with generally longitudinally extending arcuate grooves 73 (FIG 9) for partially surrounding the outer peripheries of the conduits 38. The grooves 73 function to maintain the conduits 38 in a predetermined alignment relative to one another.

The lower spacer section 46b is also provided with a generally central longitudinal groove 74 (FIG. 9) on the upper face 75 thereof. This groove 74 functions to receive the cable means 44 interposed into the system at the payout station 28. Thus, upon installation of the lower spacer section 46b adjacent and immediately forward of the payout station 28, initiation of the bundling operation is commenced. Immediately thereafter, as the spacer section 46b and the aligned conduits 38 pass through the central roller assembly 50, initiation of the operative coupling of the pipeline bundle to the flexible cable means 44 is commenced.

For this purpose a sheave assembly is provided at the payout station 28. This sheave assembly may include a cable supply pulley 76 disposed above the lower support roller 68 of the central roller assembly 50. This pulley is rotatable about a generally horizontal axis generally parallel to the axis of rotation of that roller 68. A suitable bracket arrangement indicated at 78 may be provided for mounting the pulley 76 on the support bracket 60 of the central roller assembly.

An additional feed pulley 80 may be provided for feeding of the flexible cable 44 to the cable supply pulley 76. The pulley 80 may be supported by a suitable bracket indicated at 82 (FIG. 6) on one of the outer roller assemblies 50. The feeding pulley 80 may be rotatable about an axis generally perpendicular to the axis of rotation of the other pulley 76.

The flexible cable means 44 extends from a suitably located deck winch (schematically indicated at 83 in FIG. 3) around the feeding pulley 80, and then changes direction to pass around the cable supply pulley 76. The supply pulley 76 is generally coplanar with the cable receiving groove 74 in the lower spacer section 46b as it passes through the central roller assembly 50; and the cable 44 leaving the pulley 76 is disposed adjacent to the groove 74.

As may be seen in FIG. 3, a tensiometer 84 may cooperate with the cable means 44 prior to its passage to the feeding pulley 80 so as to indicate the tension in the cable means 44 during operation. The tensiometer 84 may be of any conventional type.

At this juncture, it may be noted that the supporting roller 68 of the intermediate roller assembly 50 at the payout station 28 is disposed at an elevation below of the supporting roller 68 of the outer roller assemblies 50. Thus, in addition to convergence induced by the arrangement of the roller assemblies 50 at the payout station 28, the intermediate conduits 38 are downwardly displaced from the outer conduits 36. The purpose of this arrangement is to alter the elevation of the feed paths of the intermediate conduits 38 to accommodate superposition of the outer conduits 36 during subsequent installation of the upper section 46a of the spacer means 46.

This installation may be accomplished adjacent to the guiding and supporting station 30 illustrated in FIGS. 2 and 3. From FIG. 8 it may be seen that this supporting station 30 may include another transverse supporting member 52 suitably mounted on generally vertically extending supporting beams 54, as in the case of the previously described stations 26 and 28. However, only a single roller assembly 50 is employed.

Figure 8:
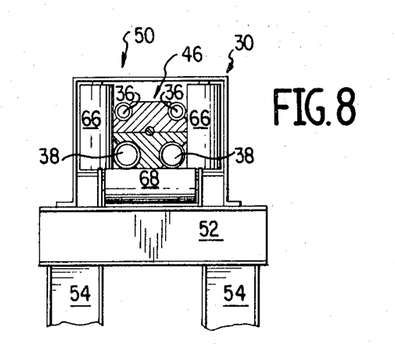
FIG. 8 is a partial transverse elevational view taken along line 8—8 of FIG. 2 and illustrating a conduit guiding and supporting station for the pipeline bundle as fully assembled.

This roller assembly 50 is substantially identical to the intermediate roller assembly 50 at the payout station 28 even from the standpoint of roller spacing and elevation. In this fashion, the lateral guiding rollers 66 cause convergence of the outer conduits 36 and maintained the inner conduits 38 in their desired aligned position. These lateral guiding rollers 66 cooperate with the spacer means 46 and the conduits grouped thereto as the pipeline bundle passes through the roller assembly 50.

In FIG. 9, it may be seen that the upper spacer section 46a is provided with two generally longitudinally extending arcuate grooves 86 for receiving and aligning the outer conduits 36. In addition, the upper spacer section 46a is provided with a generally central, longitudinally extending groove 88 in its lower face 90. This groove 88 and the complimentary groove 74 in the lower spacer section 46b cooperate to capture the flexible cable means 44 generally centrally of the pipeline bundle.

According to one technique of the present invention, the capturing of the cable means 44 is accomplished by clamping engagement of the upper and lower spacer sections 46a and 46b against the cable means. In this manner, the spacer means 46 and the cable means 44 are placed in generally longitudinal force transmitting relationship.

The spacer halves 46a and 46b may be held tightly together by means of one or more bolt assemblies 92, as indicated in phantom in FIG. 11, for the purpose of providing clamping engagement with the cable means 44. Thus, the tensioned band means 48 need only serve to bundle the conduits 36 and 38 to the spacer means 46 and to place the conduits and the spacer means in force transmitting relationship.

As shown in FIGS. 9 and 11, the upper and lower sections 46a and 46b of the spacer means 46 may be comprised of generally elongate blocks having oppositely facing portions 93 and 94 of generally rectangular cross-sectional configuration. These portions respectively merge with oppositely extending sections 96 and 98 of generally trapezoidal cross-sectional configuration, apart from the cutout portions provided by the conduit receiving grooves 86 and 73.

These grooves 86 and 73 are generally symmetrically disposed on opposite sides of the cross-sectionally trapezoidal sections 96 and 98. In the illustrated embodiment, the depth and configuration of the grooves is such as to generally conformingly accommodate approximately half the circumferential extent of the associated conduits 36 and 38 which the spacer means 46 functions to separate and align. At the same time, the cable means 44 is centrally positioned generally at the intersection of imaginery lines connecting the diagonally opposite conduits 36 and 38.

In order to insure against relative slippage between the cable means 44 and the spacer means 46, a cable clamp 99 (FIG. 10) may be interposed at each bundling zone. The cable clamps 99 are, of course, positioned on the aft side of the spacer means 46, i.e., on the side of the spacer means remote from the conduit free ends at the floating vessel means. In this fashion, when the cable means 44 is tensioned, each cable clamp 99 functions to place the cable means 44 and the spacer means 46 in generally longitudinal force transmitting relationship. This is accomplished substantially independent of the existence or non-existence of any clamping engagement of the spacer section with the cable means 44.

With reference now to FIGS. 12–15, details of another preferred embodiment of the present invention may be understood. As earlier noted, in this embodiment only two conduits 38 are grouped into the bundle 32.

Figure 13:
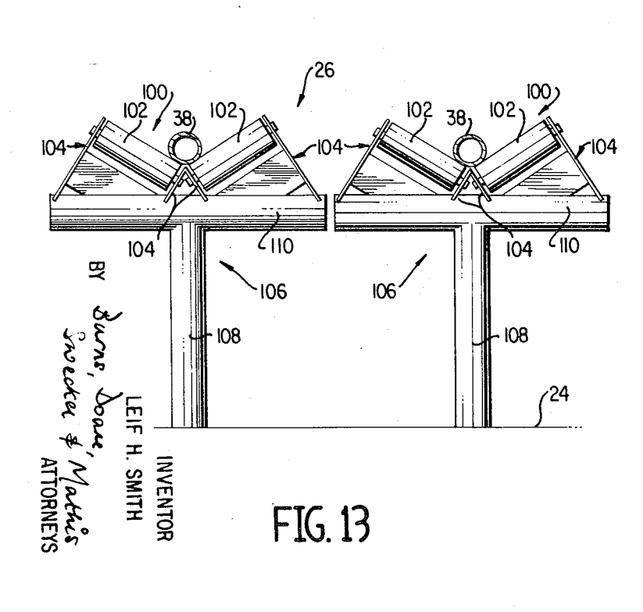
FIG. 13 is a transverse elevational view of an alternative conduit guiding and supporting station situated at a location similar to that illustrated in FIG. 4, and may be considered to be taken along line 13—13 of FIG. 1.

FIG. 13 illustrates an alternate form of the support stations 26 located in the initial portion 40 of the conduit feed paths (see FIG. 1). In this arrangement, the support section 26 includes two roller assemblies 100 laterally spaced from one another to maintain the conduits 38 laterally spaced for purposes of facilitating joining of additional pipe sections and related operations.

These V-shaped roller assemblies 100 each include two rollers 102 supported by brackets 104 for rotation about mutually downwardly inclined axes. The converging rollers 102 thus serve to both laterally guide and slidably support the conduits 38.

Each of the roller assemblies 100 may be suitably supported on a support stand 106. These stands 106 may be comprised of a generally vertically extending support member 108, and a generally horizontally extending support member 110. Each of the other support stations 26 may be similarly constructed; and the support sections 26 are arranged in longitudinal alignment with one another, as in the case of the FIG. 4 embodiment.

Figure 14:
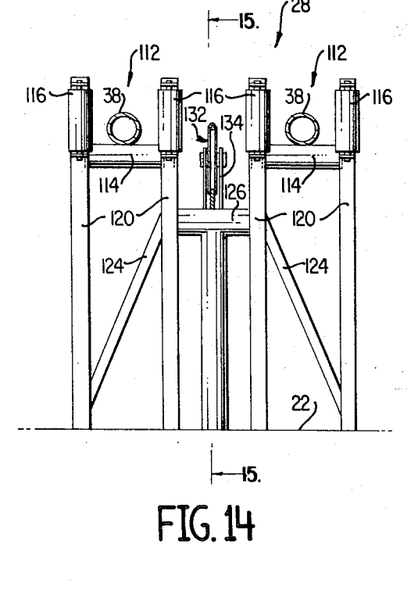
FIG. 14 is a transverse elevational view of an alternative conduit payout station situated at a location similar to that illustrated in FIG. 6, and may be considered to be taken along line 14—14 of FIG. 1.
Figure 15:
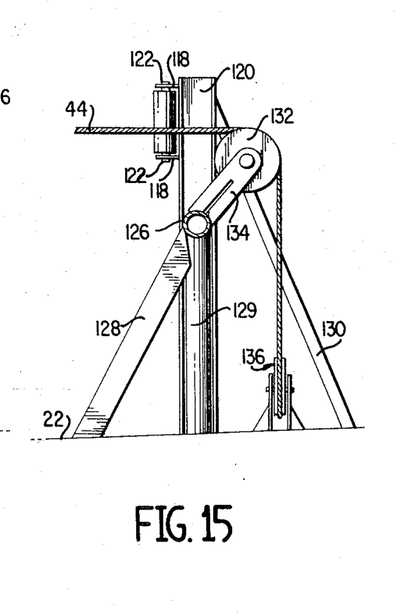
FIG. 15 is a partial cross-sectional view taken along line 15—15 of FIG. 14.

In FIGS. 14 and 15, an alternative embodiment of the conduit guiding, supporting and payout station 28 is illustrated. This station 28 may be comprised of two roller assemblies 112 respectively cooperable with one of the two conduits 38 for lateral guiding and slidable support thereof. In a manner similar to the roller assemblies 50 of FIGS. 4–8, the roller assemblies 112 include a generally horizontally extending support roller 114 on opposite sides of which generally vertically extending guide rollers 116 may be positioned.

The lateral guiding rollers 116 may be supported on superimposed brackets 118 (FIG. 15) extending from generally vertical struts 120 at a suitable elevation. Rotatable mounting of the rollers 116 may be facilitated by shafts indicated at 122.

The struts 120 supported on the inclined ramp 22 may be braced relative to one another by generally diagonally extending interconnecting struts 124 which may also be of tubular configuration. The middle two generally vertical struts 120 may also be interconnected by a generally horizontally extending member 126, which may function as a support for a portion of a sheave assembly.

This support 126 may in turn be braced and supported by rearwardly inclined and vertical supporting struts 128 and 129. The outer generally vertical supports 120 may be additionally braced by inclined supporting struts 130.

Included in the sheave assembly is a cable supply pulley 132 mounted for rotation about a generally horizontal axis. A bracket 134 may serve to rotatably interconnect the pulley 132 to the sheave support member 126.

Suitably mounted on the inclined ramp 22 below the first pulley 132 is an additional pulley 136. This pulley functions as a feed pulley in a manner similar to the pulley 80 illustrated in FIGS. 6 and 7.

As in the previously described embodiment, a suitable tensiometer may be employed to control the tension of the flexible cable 44 passing from the deck winch around the feed pulley 136 and around the servicing pulley 132. In the arrangement illustrated, the cable 44 emerges intermediate the roller assemblies 112.

Between the payout station 28 and the single roller assembly station 30 (which may take the form of the FIG. 8 illustration), the conduits 38 are caused to converge toward one another for bundling. If desired, this convergence may be initiated at the payout station 28 by proper spacing of the roller assemblies 112. Adjacent but forward of the single roller assembly station 30, bundling of the conduits 38 is effected to produce a pipeline bundle cross-sectionally illustrated in FIG. 12.

For this purpose, a spacer means 46, which may also serve to align the conduits 38 may be employed. This spacer means 46 may be comprised of a generally elongated block similar in cross-sectional configuration to the upper spacer block 46a illustrated in FIG. 11. However, instead of at the lower portion thereof, a generally central longitudinally extending, cable means receiving channel 138 is provided on the upper face thereof.

On the diagonal sides of the spacer block 46, alignment grooves 140 are fashioned. These generally longitudinally extending grooves 140 are generally arcuate for conforming engagement with a portion of the outer periphery of the conduits 38.

As may be seen in FIG. 12, the dimensions of the spacer block 46, the cable means receiving groove 138, and the alignment grooves 140 are such that when the conduits 38 are strapped to the spacer block 46 through the use of the band means 48, the cable 44 is clampingly engaged between the facing conduit peripheries and the spacer block. In this manner, the tensioned cable means 44 is placed in generally longitudinal force transmitting relationship with the spacer block 46. Again, the conduits in the bundle 32 are placed in generally force transmitting relationship with the spacer block 46 by the band means 48.

In summary, a pipeline bundle laying operation according to the present invention entails the establishment of feed paths where generally lateral guiding and longitudinal support of the conduits is accomplished on the floating vessel means. These feed paths may be initially provided by the roller assemblies at the guiding stations 26. During the initial portion 40 of the feed path defined by the guiding sections 26, the end portions of the conduits on the floating vessel means are maintained generally laterally spaced from one another.

However, the feed paths are situated such that the conduits eventually converge toward a bundling station on the inclined ramp portion 22 of the floating vessel means 20. In both of the previously described embodiments of the present invention, the bundling station is located adjacent the first single roller support assembly 30.

In the embodiment of FIGS. 12–15, convergence of the conduits 38 need only be initiated between the payout station 28 and the bundling zone adjacent the first single roller assembly support station 30. However, in the embodiment of FIGS. 2–11, since four conduits are to be grouped in the bundle, initial convergence of the intermediate conduits may be accomplished between the last initial support station 26 and the payout station 28. Convergence of the remaining two outer conduits can be accomplished between the payout station 28 and the bundling zone adjacent the first single roller assembly station 30.

Generally, the vertical level of the conduits in the embodiments of FIGS. 12–15 may be constant until the paths of the conduit pass the station 30 adjacent the bundling zone. This may be accomplished through suitable dimensioning the supporting members of the roller assemblies or the roller elements themselves.

However, in the embodiment of FIGS. 2–11, the roller arrangement is such to permit a slight upward vertical displacement of the extreme conduits 36 adjacent the payout station 28. In this fashion, the convergence of the outer conduits 36 toward one another at a level above the intermediate conduits 38 may be accomplished at the bundling zone. Generally the vertical level of the intermediate conduits 38 may be maintained constant until passage of the conduits from the support station 30 adjacent the bundling zone.

At the feeding station 28, a tensioned cable means 44 is interposed intermediate the conduits. Control of the tension of the cable means controls the stress level and payout of the pipeline bundle 32.

At the bundling station, the conduits are strapped to a spacer means 46 to place them in force transmitting relationship therewith. At the same time, the flexible cable means 44 is placed in generally longitudinal force transmitting relationship with the spacer means 46. This may be accomplished by clampingly engaging the cable means 44 with the spacer means 46.

In one illustrated embodiment, the cable means 44 is additionally clamped by the conduits 38. In the other embodiment, the cable means 44 may be placed between the two spacer halves 46a and 46b. According to this latter embodiment, additionally or alternatively, a wireline clamp may be employed.

In any event, the weight of the pipeline bundle is transmitted to the cable means 44 at each of the bundling zones. It will be appreciated that as a sufficient length of the bundle 32 is payed out, additional bundling operations are performed at the bundling station adjacent the guiding and support station 30.

SUMMARY OF ADVANTAGES

From the foregoing, it may be seen that according to the present invention an efficient method and apparatus for laying a pipeline bundle by employing a cable to control the profile of the bundle are provided. Particularly, the integrity of the pipelines and the bundle is maintained.

Where the spacer means is also employed as alignment means, proper orientation of the pipeline and the bundle is enhanced.

Of independent significance is the operative coupling of the pipeline bundle to the cable by using a spacer, the strapping of the conduits to the spacer means and the placing of the spacer means and the cable means in force transmitting relationship in a manner which transmits the weight of the pipeline bundle to the cable at the bundling zones.

Additional advantages may be realized through the stability obtained by positioning of the cable means within the envelope defined by the girding means surrounding the conduits. This stability is further enhanced where the cable is generally symmetrically located with respect to the lateral extent of the bundle envelope.

The placing of the cable means and the pipeline means in operatively coupled relationship through clamping engagement of the cable means with at least the spacer means and/or through the use of wireline clamps is particularly advantageous from the standpoint of ease of the bundle assembly operation.

Further advantages are provided through the provision of feed paths for laterally and generally longitudinally guiding the conduits on the floating vessel means. The feed paths maintain the end portions of the conduits laterally spaced for joining additional sections, and each feed path converges toward the bundling station.

Related advantages are obtained where more than two conduits are to be grouped into the bundle if the feed paths are also defined so as to maintain desirable differences in conduit elevation at appropriate locations.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A method of laying an elongate, flexible continuous pipeline bundle comprised of a plurality of elongate, flexible, continuous conduits, from a floating vessel and onto a submerged surface, the method comprising:

supporting a portion of the plurality of conduits on the floating vessel with a further portion thereof depending into a body of water toward the submerged surface;

extending a tensioned and elongate, flexible cable means from the floating vessel toward the submerged surface;

bundling the plurality of conduits together, at a plurality of bundling zones spaced longitudinally along the conduits, by strapping the plurality of conduits to conduit spacer means to place the pipeline bundle and the spacer means in force transmitting relationship;

operatively coupling the pipeline bundle to the tensioned flexible cable means at the longitudinally spaced bundling zones by placing the spacer means and the cable means in generally longitudinal force transmitting relationship; and paying out the flexible cable and the continuous pipeline bundle into the body of water while controlling the tension in the flexible cable to control the profile thereof and the profile of the continuous pipeline bundle; the generally longitudinal force transmitting interaction of the cable means and the spacer means, and the force transmitting relationship of the spacer means and the pipeline bundle together serving to react the weight of the pipeline bundle by tensile forces in the cable means at the bundling zones.

2. The method according to claim 1 wherein:

the spacer means and the cable means are placed in generally longitudinal force transmitting relationship by placing at least the spacer means in clamping engagement with the cable means.

3. The method according to claim 2 wherein:
the spacer means and the cable means are placed in generally longitudinal force transmitting relationship by placing the two sections of the spacer means in clamping engagement with the cable means.

4. The method according to claim 2 wherein:
the spacer means and the cable means are placed in generally longitudinal force transmitting relationship by placing the spacer means and a portion of the conduit bundle in clamping engagement with the cable means.

5. The method according to claim 2 wherein:
the spacer means and the cable means are placed in generally longitudinal force transmitting relationship by positioning a plurality of cable clamps on the cable means adjacent the ends of the spacer means remote from the ends of the conduits on the floating vessel means.

6. The method according to claim 1 wherein:
the spacer means and the cable means are placed in generally longitudinal force transmitting relationship by positioning a plurality of cable clamps on the cable means adjacent the ends of the spacer means remote from the ends of the conduits on the floating vessel means.

7. The method according to claim 1 wherein:
the step of bundling comprises aligning and maintaining the plurality of conduits in a predetermined relative orientation with the spacer means.

8. The method according to claim 7 wherein:
the conduits are strapped to the spacer means with girding means surrounding the conduits and the spacer means, and wherein
the step of operatively coupling the bundle to the cable means comprises positioning the cable means within the bundle envelope defined by the girding means.

9. The method according to claim 8 wherein:
the cable means is positioned generally symmetrically with respect to the lateral extent of the bundle.

10. The method according to claim 1 including the step of:
providing a feed path for each of the conduits on the floating vessel means, with each of the feed paths maintaining the end portions of the conduits laterally spaced and with each of the feed paths converging toward a bundling station.

11. The method according to claim 10 wherein:
the feed paths maintain at least some of the conduits at different elevations along a portion thereof.

12. A method of laying an elongate, flexible continuous pipeline bundle comprised of a plurality of elongate, flexible, continuous conduits, from a floating vessel and onto a submerged surface, the method comprising:
supporting a portion of the plurality of conduits on the floating vessel with a further portion thereof depending into a body of water toward the submerged surface;
extending a tensioned and elongate, flexible cable means from the floating vessel toward the submerged surface;
bundling the plurality of conduits together, at a plurality of bundling zones spaced longitudinally along the conduits, and maintaining the conduits in a predetermined orientation by strapping the plurality of conduits to conduit spacer means with girding means to place the pipeline bundle and the spacer means in force transmitting relationship;
operatively coupling the pipeline bundle to the tensioned flexible cable at the longitudinally spaced bundling zones by placing the spacer means and the cable means in generally longitudinal force transmitting relationship with the cable positioned within the bundle envelope defined by the girding means; and
paying out the flexible cable and the continuous pipeline bundle into the body of water while controlling the tension in the flexible cable to control the profile thereof and the pipeline of the continuous pipeline of the continuous pipeline bundle;
the generally longitudinal force transmitting interaction of the cable means and the spacer means, and the force transmitting relationship of the spacer means and the pipeline bundle together serving to react the weight of the pipeline bundle by tensile forces in the cable means at the bundling zones.

13. The method according to claim 12 wherein:
the spacer means and the cable means are placed in generally longitudinal force transmitting relationship by placing at least the spacer means in clamping engagement with the cable means.

14. The method according to claim 13 wherein:
the spacer means and the cable means are placed in generally longitudinal force transmitting relationship by placing the two sections of the spacer means in clamping engagement with the cable means.

15. The method according to claim 12 wherein:
the cable means is positioned generally symmetrically with respect to the lateral extent of the bundle.

16. The method according to claim 12 including the step of:
providing a feed path for each of the conduits on the floating vessel means, with each of the feed paths maintaining the end portions of the conduits laterally spaced and with each of the feed paths converging toward a bundling station.

17. The method according to claim 16 wherein:
the feed paths maintain at least some of the conduits at different elevations along a portion thereof.

18. Apparatus for laying a continuous pipeline bundle, comprised of a plurality of conduits, onto a submerged surface comprising:
floating vessel means from which the continuous pipeline bundle extends toward the submerged surface;
a plurality of conduit spacer means, positioned at bundling zones longitudinally spaced along the length of the continuous pipeline bundle, for spacing the conduits of the bundle;
cable means extending from said floating vessel means along the continuous pipeline bundle and interacting with said spacer means in generally longitudinal force transmitting relationship;

a plurality of girding means for strapping the plurality of conduits to each of said spacer means to place said spacer means and the continuous pipeline bundle in force transmitting relationship; and payout means on said floating vessel means for imparting tension to said cable means;

the generally longitudinal force transmitting interaction of the cable means and the spacer means, and the force transmitting relationship of the spacer means and the pipeline bundle together serving to react the weight of the pipeline bundle by tensile forces in the cable means at the bundling zones.

19. The apparatus according to claim 18 wherein: said spacer means comprise means for aligning the conduits of the bundle in a predetermined orientation.

20. The apparatus according to claim 18 wherein: said spacer means are comprised of two sections for clampingly engaging said cable means.

21. The apparatus according to claim 18 wherein: said spacer means are comprised of two sections for receiving said cable means therebetween.

22. The apparatus according to claim 21 and including:
a plurality of cable stop clamp means on the cable means adjacent the ends of the spacer means remote from the ends of the conduits on said floating vessel means.

23. The apparatus according to claim 18 including:
a plurality of roller assemblies defining feed paths for laterally and generally longitudinally guiding the conduits on said floating vessel means;
said feed paths maintaining the end portions of the conduits laterally spaced and each converging towards a bundling station.

24. The apparatus according to claim 23 wherein: said roller assemblies are arranged to maintain at least some of the conduits at different elevations along a portion of said feed paths.

25. Apparatus for laying a continuous pipeline bundle, comprised of a plurality of conduits, onto a submerged surface comprising:
floating vessel means from which the continuous pipeline bundle extends toward the submerged surface;
a plurality of conduit spacer means, positioned at bundling zones longitudinally spaced along the length of the continuous pipeline bundle, for aligning the conduits of the bundle in a predetermined spaced orientation;
cable means extending from said floating vessel means along the continuous pipeline bundle;
a plurality of girding means for strapping the plurality of conduits to each of said spacer means to place said spacer means and the continuous pipeline bundle in force transmitting relationship;
payout means on said floating vessel means for imparting tension to said cable means transmitted to said plurality of spacer means; and
means for placing said cable means and said spacer means in generally longitudinal force transmitting relationship;

the generally longitudinal force transmitting interaction of the cable means and the spacer means, and the force transmitting relationship of the spacer means and the pipeline bundle together serving to react the weight of the pipeline bundle by tensile forces in the cable means at the bundling zones.

26. The apparatus according to claim 25 wherein: said means for placing said cable means and said spacer means in generally longitudinal force transmitting relationship comprise a plurality of cable stop clamp means on the cable means adjacent the ends of the spacer means remote from the ends of the conduits on said floating vessel means.

27. The apparatus according to claim 25 wherein: said means for placing said cable means and said spacer means in generally longitudinal force transmitting relationship comprise said spacer means and a portion of said bundle in clamping engagement with said cable means.

28. The apparatus according to claim 25 wherein: said means for placing said cable means and said spacer means in generally longitudinal force transmitting relationship comprise sections of said spacer means clampingly engaging said cable means.

29. The apparatus according to claim 25 including:
a plurality of roller assemblies defining feed paths for laterally and generally longitudinally guiding the conduits on said floating vessel means;
said feed paths maintaining the end portions of the conduits laterally spaced and each converging toward a bundling station.

30. The apparatus according to claim 29 wherein: said roller assemblies are arranged to maintain at least some of the conduits at different elevations along a portion of said feed paths.

31. A method of laying an elongate, flexible continuous pipeline bundle comprised of a plurality of elongate, flexible, continuous conduits, from a floating vessel and onto a submerged surface, the method utilizing a tensioned, elongate, flexible cable means to which the pipeline bundle is operatively coupled, the method comprising:
supporting a portion of the plurality of conduits on the floating vessel with a further portion thereof depending into a body of water toward the submerged surface;
extending the tensioned and elongate, flexible cable means from the floating vessel toward the submerged surface;
bundling the plurality of conduits together, at a plurality of bundling zones spaced longitudinally along the conduits, by girding means surrounding the conduits and defining a bundling envelope;
positioning the cable means so as to extend longitudinally of the bundle within the bundle envelope; and
paying out the flexible cable and the continuous pipeline bundle operatively coupled thereto into the body of water while controlling the tension in the flexible cable to control the profile thereof and the profile of the continuous pipeline bundle.

32. Apparatus for laying a continuous pipeline bundle, comprised of a plurality of conduits, onto a submerged surface comprising:

floating vessel means from which the continuous pipeline bundle extends toward the submerged surface;

a plurality of girding means, surrounding the conduits and defining a bundle envelope, for bundling the plurality of conduits together at a plurality of bundling zones spaced longitudinally along the conduits;

cable means, extending from said floating vessel means longitudinally of the continuous pipeline bundle within said bundle envelope, said cable means being operatively coupled to said bundle; and payout means on said floating vessel means for imparting tension to said cable means to control the profile thereof and the profile of the continuous pipeline bundle.

* * * * *